G. E. MORRISS & H. F. BEARD.
BAND CUTTER AND FEEDER.
APPLICATION FILED MAR. 15, 1909.
962,235.
Patented June 21, 1910.
3 SHEETS—SHEET 1.
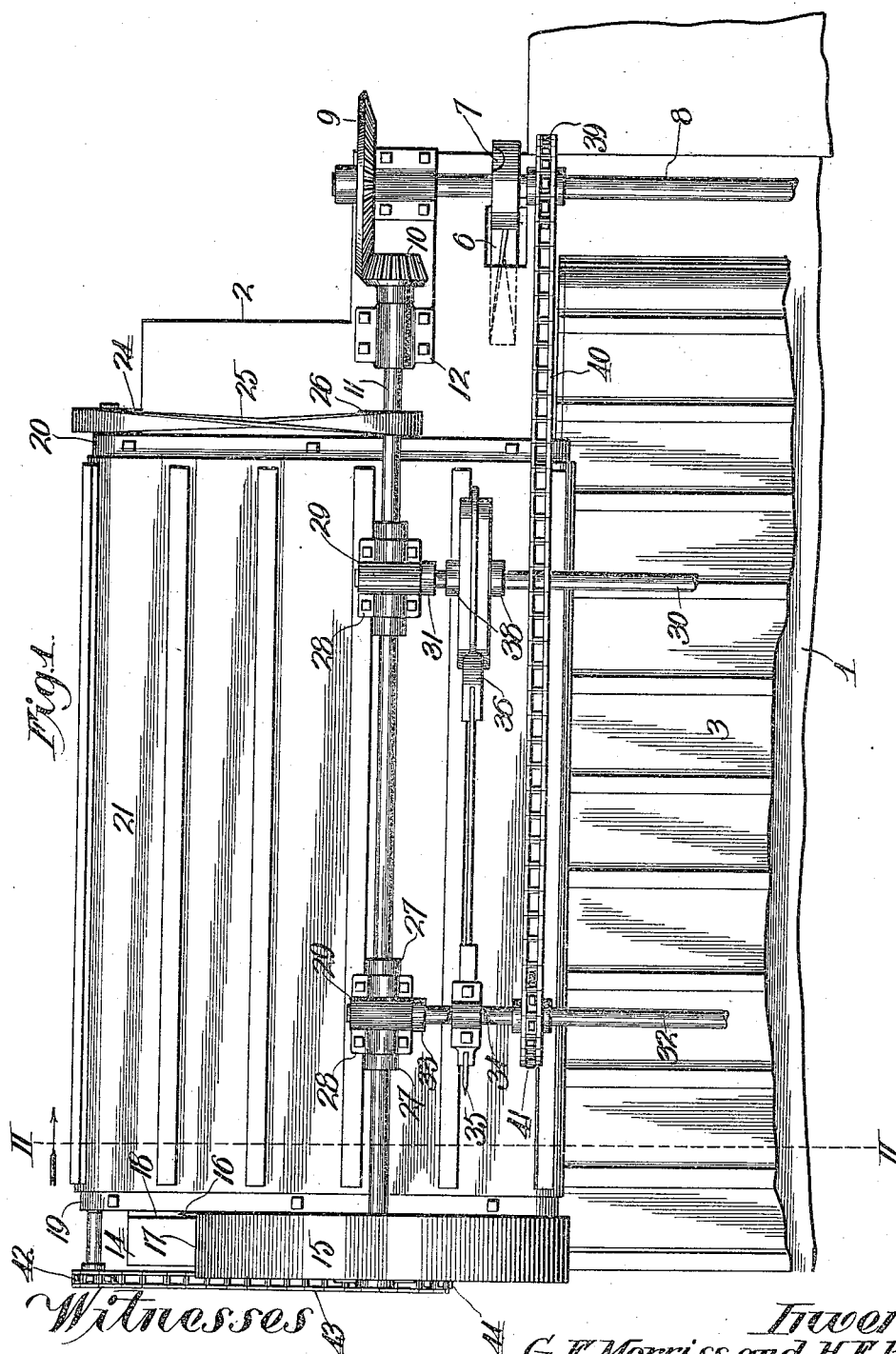
Witnesses
Frank R. Glore.
M. A. O'Donnell.
Inventors:
G. E. Morriss and H. F. Beard
By
George A. Thorpe Atty.

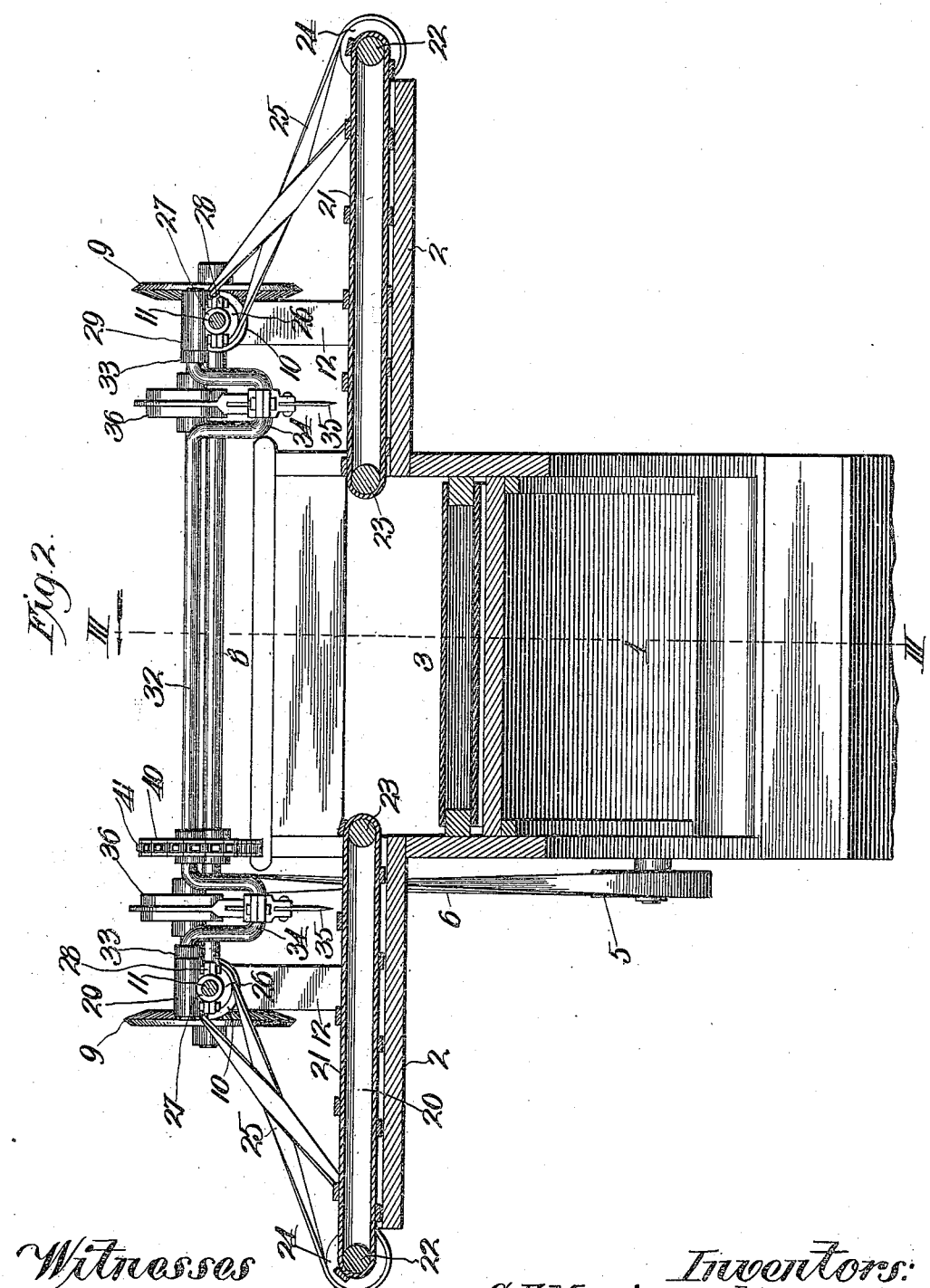

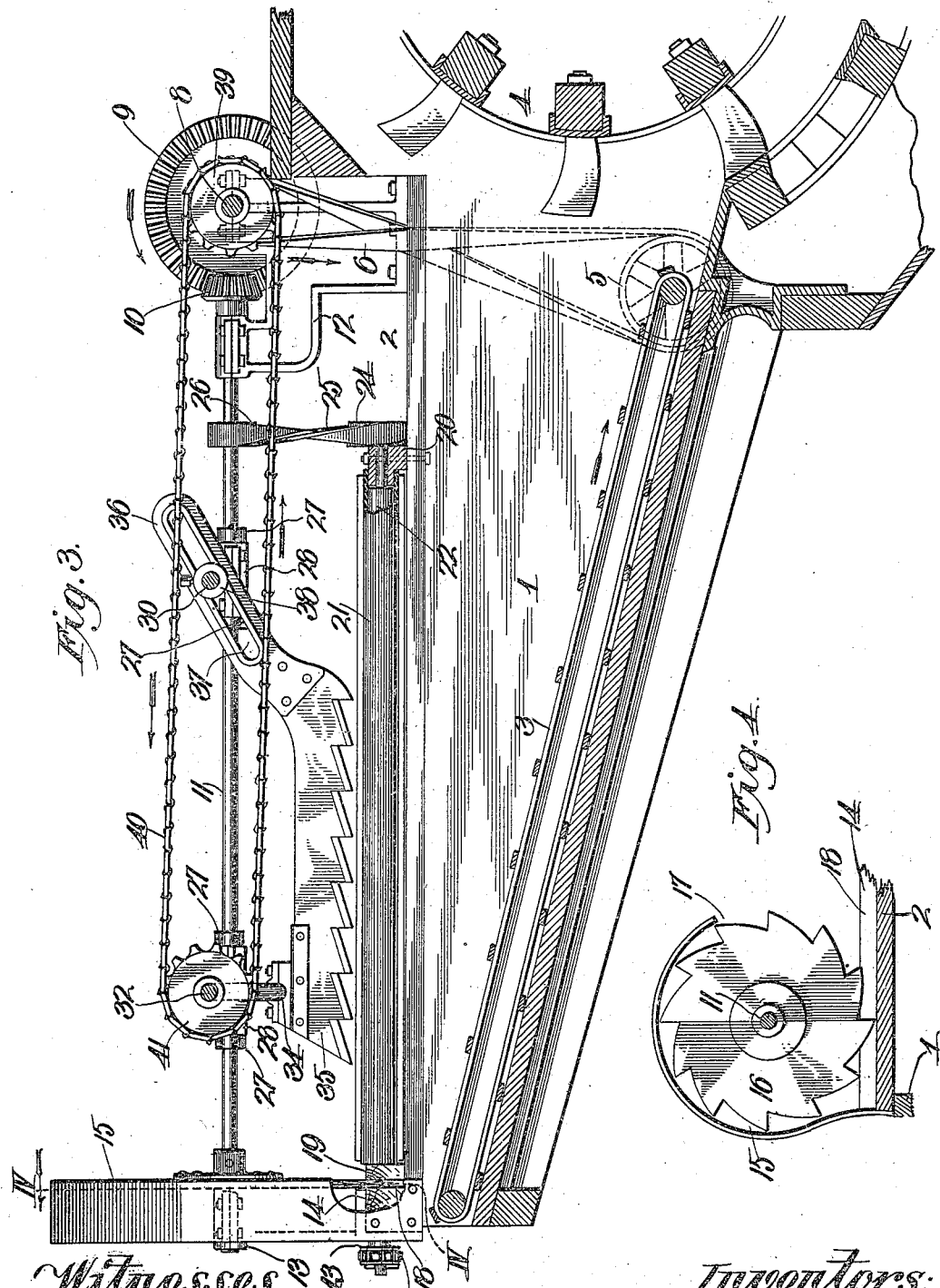

UNITED STATES PATENT OFFICE.

GARNETT E. MORRISS AND HORACE F. BEARD, OF MOUNDS, OKLAHOMA; SAID MORRISS ASSIGNOR TO SAID BEARD.

BAND-CUTTER AND FEEDER.

962,235.  Specification of Letters Patent.  Patented June 21, 1910.

Application filed March 15, 1909. Serial No. 483,613.

*To all whom it may concern:*

Be it known that we, GARNETT E. MORRISS, and HORACE F. BEARD, citizens of the United States, residing at Mounds, in the county of Creek and State of Oklahoma, have invented certain new and useful Improvements in Band-Cutters and Feeders, of which the following is a specification.

Our invention relates to self feeders for threshing machines and more especially to machines of this character for handling rice, our object being to produce means whereby bundles of rice may be handled efficiently and expeditiously and by which the butts of any bundles coated with dirt may be automatically severed without interfering with the feeding and band cutting operations.

With this general object in view the invention consists in certain novel and peculiar features of construction and organization as hereinafter described and claimed; and in order that it may be fully understood reference is to be had to the accompanying drawings, in which, Figure 1, is a plan view of a part of a self feeder embodying the invention. Fig. 2, is a vertical section taken on the line II—II of Fig. 1. Fig. 3, is a vertical section taken on the line III—III of Fig. 2. Fig. 4, is a section on the line IV—IV of Fig. 3, but on a smaller scale.

In the said drawings 1 indicates a chute and 2, the tables projecting laterally therefrom, of an ordinary or any preferred type of threshing machine.

3 indicates an endless-belt conveyer arranged in and near the bottom of the chute for the purpose of conveying the unthreshed grain to the cylinder 4, one of the shafts of the conveyer being equipped with a belt-wheel 5 connected by a crossed-belt 6 with a belt-wheel 7 on a transverse shaft 8, adapted to be driven in any suitable manner, not shown, from the cylinder 4 or other revolving element of the threshing machine. Mounted rigidly on the opposite ends of shaft 8 are gear-wheels 9 meshing with bevel gear-wheels 10 on the front ends of longitudinal shafts 11 overlying tables 2 and journaled at their front ends in bearing standards 12, and at their rear ends in bearing standards 13 rising from end-bars 14 secured to the rear ends of the tables, said bars being also equipped with substantially circular guards 15 for rotary cutters 16 secured on shafts 11, the walls of the said guards being cut away at their outer sides at 17, to permit bundles of grain to engage the rotary cutters that the butts of such bundles may be properly severed. The rotary cutters depend into slots 18 formed by and between bars 14 and transverse bars 19, which bars with similar bars 20, are bolted or otherwise suitably secured to tables 2 and form the sides of frames for transverse belt-conveyers 21, said bars forming journal bearings for the rollers 22 and 23 of said conveyers, and in order to impart movement to said conveyers, belt-wheels 24 are mounted on the front ends of said rollers and are connected by crossed belts 25 to belt-wheels 26 mounted on shafts 11.

Journaled on shafts 11 at suitable points and held from endwise movement thereon by collars 27, are bearings 28 equipped with transverse bearings 29. A transverse rod 30 bridging the chute is secured at its ends in the front pair of bearings 29 and is equipped with a pair of collars 31 at the inner ends of said bearings 29, to act as a stiffener for the shafts 11 against lateral vibration. A transverse shaft 32 is journaled at its ends in the other pair of bearings 29, and like the rod 30, bridges the chute and is equipped with a pair of collars 33 at the inner ends of bearings 29 to assist in preventing lateral vibration of the shafts 11. Shaft 32 is provided near each end over conveyers 21, with cranks 34 upon which are pivoted longitudinally-extending cutting blades 35 equipped with inclined arms 36 provided with longitudinal slots 37 which receive the rod 30, the latter having a pair of collars 38 at opposite sides of the said arms to prevent lateral movement of the same upon the rod.

39 indicates a sprocket wheel secured on shaft 8 and connected by a longitudinally-extending sprocket chain 40 to sprocket wheel 41 rigidly secured on the cutting-blade-actuating shaft 32, said cutting blades being preferably of the saw-tooth type and adapted to be driven at a sufficient speed by preference, to have at least two opportunities for cutting the band of each bundle fed inwardly on conveyers 21, as a guard against the possibility of a bundle reaching the cylinder with its band uncut.

In practice, wagons containing the bundles are driven along each side of the machine and the bundles are dropped upon the conveyers 21, so that they shall extend substantially parallel to shafts 11 with their heads disposed toward the threshing machine, this arrangement disposing the bands at right angles to the cutting blades and giving the latter a better opportunity to sever the bands as the bundles pass by. The rotation of shaft 32 imparts rotary movement to the rear ends of the blades and reciprocatory movement to their front ends, the result of this movement being to cause the blades in their downward and forward movements to cut longitudinally downward into the bundles and sever the bands intersecting such plane of movement, the parts being so proportioned that the cutting edges of the blades cannot come into contact with the underlying conveyers. Whenever an operator picks up a bundle coated with dirt at its butt end, he drops such bundle upon the end of the adjacent conveyer 21 with the dirt-coated end projecting rearward beyond the rotary cutter so that as the conveyer carries such bundle inward said cutter severs the dirt-coated butts. To prevent the butt ends of the bundles, because of their greater weight, from lagging and causing the bundles to assume such an angle to the cutting blades that their bands may escape the blades, traveling supports or conveyers are provided, constructed as follows: The outer shafts 22 of the conveyers 21 are prolonged rearwardly beyond bars 14 and are equipped at their rear ends with sprocket wheels 42 connected by chains 43 with idler sprockets 44 bearing a journaled relation to the rear sides of bars 14 and disposed some distance outward of the chute so that the dirt-covered butt ends after being severed are dropped upon the ground at opposite sides of the chute.

It frequently occurs that the bundles of rice in shocks become coated with dirt, due to imperfect drainage or to heavy rains, this condition being accentuated because of the fact that rice is grown in low or marsh lands where mud is prevalent. Heretofore it has been customary to manually sever the dirt-coated ends of the bundles preliminary to the threshing operation as the presence of the dirt depreciates the value of the rice. With a machine of the character described, the dirt-covered butts are automatically severed and dropped upon the ground without interrupting or delaying the feeding and band-cutting operations and therefore at minimum expense.

From the above description it will be apparent that we have produced a self feeder for threshing machines embodying the features of advantage enumerated as desirable, which is of comparatively simple and inexpensive construction, and which is strong and durable and can be applied if desired, as an attachment to an ordinary threshing machine, it being of course apparent that the invention is susceptible of modification in minor particulars without departing from the principle and scope or sacrificing any of the advantages of the appended claims.

Having thus described the invention what we claim as new and desire to secure by Letters-Patent, is:

1. A machine of the character described, comprising a chute, a conveyer at one side of and adapted to discharge into the chute, a shaft above and extending transversely of the conveyer and parallel with the longitudinal center of the chute, a rotary cutter mounted upon said shaft at the rear side of the conveyer, a suitably-supported rod extending at right angles to said shaft, a shaft paralleling said rod and provided with a crank above the conveyer, a longitudinally-arranged cutting blade above the conveyer and pivotally suspended at its rear end from said crank and pivotally and slidably supported at its front end on said rod, and means for imparting movement to the conveyer, the rotary cutter and the shaft provided with the crank.

2. A machine of the character described, comprising a chute, a pair of lateral conveyers at opposite side of and adapted to discharge into the chute, longitudinal shafts overlying and geared to the conveyers, rotary cutters mounted upon said shafts rearward of the conveyers, a transverse rod bridging the chute and suitably supported, a transverse shaft bridging the chute and suitably supported and provided over each conveyer with a crank, longitudinally-arranged cutting-blades overlying the conveyers and pivotally suspended at their rear ends from said cranks and pivotally and slidably supported at their front ends on said rod, and means for imparting movement to the conveyers, the rotary cutters and the crank-shafts.

3. A machine of the character described, comprising a chute, tables projecting laterally from opposite sides of the chute, transverse bars on the rear ends of the tables, endless-conveyer-frames secured upon the tables forward of said bars and forming in conjunction therewith transverse slots, endless conveyers carried by said frames, overlying the tables and adapted to discharge into the chute, longitudinal shafts suitably supported, overlying said conveyers, rotary cutters secured on the shafts and depending into the said slots, a transverse rod suitably supported and bridging the chute, a transverse shaft suitably journaled and bridging the chute and provided with a pair of cranks overlying said conveyers, longitudinally-arranged cutting-blades pivoted to said cranks at their rear ends and provided with inclined longitudinally-slotted arms at their front ends, engaging said rod, and means for imparting movement to said conveyers, rotary cutters, and crank shaft.

4. A machine of the character described, comprising a chute, tables projecting laterally from opposite sides of the chute, transverse bars on the rear ends of the tables, endless-conveyer-frames secured upon the tables forward of said bars and forming in conjunction therewith transverse slots, endless conveyers carried by said frames, overlying the tables and adapted to discharge into the chute, longitudinal shafts suitably supported, overlying said conveyers, rotary cutters secured on the shafts, and depending into the said slots, a transverse rod suitably supported and bridging the chute, a transverse shaft suitably journaled and bridging the chute, and provided with a pair of cranks overlying said conveyers, longitudinally-arranged cutting-blades pivoted to said cranks at their rear ends and provided with inclined longitudinally-slotted arms at their front ends, engaging said rod, short transverse conveyers movable with the first-named conveyers and arranged rearward of the rotary cutters, and means for imparting movement to the said conveyers, rotary cutters and crank shaft.

In testimony whereof we affix our signatures in presence of two witnesses.

GARNETT E. MORRISS.
HORACE F. BEARD.

Witnesses:
DAVID L. OWSLEY,
JAMES J. BEARD.